US007484085B2

United States Patent
Chan et al.

(10) Patent No.: US 7,484,085 B2
(45) Date of Patent: Jan. 27, 2009

(54) BOOTING METHOD AND A COMPUTER USING THE BOOTING METHOD

(75) Inventors: Yen-Kun Chan, ZhongHe (TW); Ai-Wen Chien, Taipei (TW); Shiang Steve Charng, Taipei (TW)

(73) Assignee: Via Technologies, Inc., Taipei (TW)

( * ) Notice: Subject to any disclaimer, the term of this patent is extended or adjusted under 35 U.S.C. 154(b) by 364 days.

(21) Appl. No.: 11/268,885

(22) Filed: Nov. 8, 2005

(65) Prior Publication Data

US 2007/0038685 A1 Feb. 15, 2007

(30) Foreign Application Priority Data

Aug. 3, 2005 (TW) .............. 94126338 A

(51) Int. Cl.
*G06F 9/00* (2006.01)
(52) U.S. Cl. .............. 713/2; 713/1; 713/100
(58) Field of Classification Search ...... 713/1, 713/2, 100
See application file for complete search history.

(56) References Cited

U.S. PATENT DOCUMENTS

| | | | |
|---|---|---|---|
| 6,178,503 B1* | 1/2001 | Madden et al. ............... 713/2 |
| 6,199,159 B1* | 3/2001 | Fish ............................... 713/2 |
| 6,763,458 B1* | 7/2004 | Watanabe et al. ............ 713/100 |
| 6,839,864 B2* | 1/2005 | Mambakkam et al. ......... 714/5 |
| 2003/0115443 A1* | 6/2003 | Cepulis et al. ................. 713/2 |
| 2003/0188179 A1* | 10/2003 | Challener et al. ........... 713/193 |
| 2004/0068645 A1* | 4/2004 | Larvoire ........................ 713/1 |
| 2004/0237086 A1* | 11/2004 | Sekiguchi et al. ........... 718/100 |
| 2006/0168440 A1* | 7/2006 | Huang ........................... 713/2 |

* cited by examiner

*Primary Examiner*—James Trujillo
*Assistant Examiner*—Md. I Uddin
(74) *Attorney, Agent, or Firm*—Thomas, Kayden, Horstemeyer & Risley

(57) ABSTRACT

A booting method is implemented in a computer system including a processor, a read-only memory (ROM), a main memory, and a storage device. The ROM stores a loader program, a first file name corresponding to a kernel and a file system of a first operating system, and a second file name corresponding to a kernel and a file system of a second operating system. When the computer boots, the processor first reads and executes instructions from the ROM to initiate the computer system. If the storage device comprises an operating system the kernel file name and file system of which are same as the first operating system or the second operating system, the computer loads the operating system kernel to the main memory for execution.

19 Claims, 4 Drawing Sheets

BOOTING METHOD AND A COMPUTER USING THE BOOTING METHOD

BACKGROUND

The invention relates to a computer system. More particularly, the invention relates to a computer system with multiple operation systems and a method for booting the computer system.

Conventionally, kernel loaders are customized with their respective operating systems (OS), such that each loader is dedicated to loading its own OS. For example, a loader for Microsoft Windows CE can not be loaded on the Linux OS. A single computer, however, can have multiple OSs installed. Each loader corresponding to OS is typically stored in a storage device such as the master boot record (MBR) of a hard disk or a boot sector of a hard disk partition instead of being stored on a main board.

During the conventional booting process, a computer processor first executes the instructions of the basic input/output system (BIOS) for system initialization. Next, the BIOS points to an MBR of a hard disk being booted wherein the MBR comprises a partition table and a program which directs the processor to retrieve an OS kernel or a kernel loader from a boot sector of a partition.

In addition, several loaders are loaded from storage devices into main memory when booting a conventional computer, and then an OS kernel is loaded lastly. As such, time consuming is the most concern.

For example, Microsoft disk operating system (MS-DOS) must first be loaded to execute loading instructions for Microsoft Windows CE. Thus, a MS-DOS OS must be installed, and loaded during a boot process, which is time consuming.

SUMMARY

Accordingly, this invention provides a computer system with multiple operation systems and a method for booting the computer system.

An exemplary embodiment of a computer system comprises a main memory, a read-only memory (ROM), storage device, and a processor. The ROM stores a loader program, a first file name corresponding to a kernel of a first operating system (OS), and a second file name corresponding to a kernel of a second operating system different from the first operating system. The storage device stores a kernel of a third operating system. The processor coupled to the main memory, the ROM, and the storage device. When the computer boots, the processor first reads and executes instructions on the ROM to initiate the computer. When the kernel file name of the third operating system is the same as the first file name or the second file name, the computer utilizes the loader program and loads the kernel of the third operating system to the main memory for execution.

An exemplary embodiment of a booting method is implemented in a computer system. The method comprises providing a loader program and several file names corresponding to operating systems, executing the loader program by the processor for initialization of the computer, and loading a kernel of a third operating system wherein the kernel file name of the third operating system is the same as the first file name or the second file name.

DESCRIPTION OF THE DRAWINGS

The invention can be more fully understood by reading the subsequent detailed description and examples with references made to the accompanying drawings, wherein.

DETAILED DESCRIPTION

A computer system with multiple operation systems and a method for booting the computer system are provided by this invention.

Figure 1:
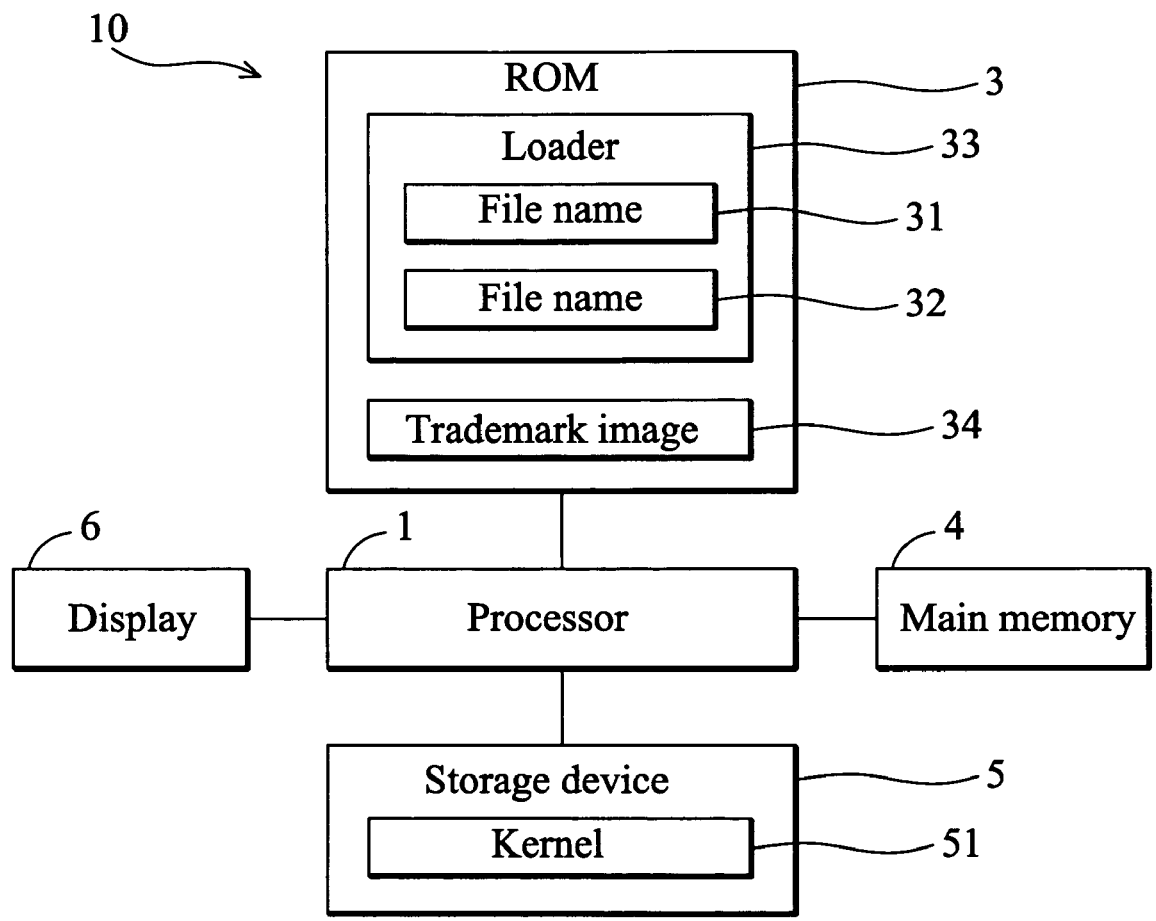
FIG. 1 is a block diagram of an exemplary embodiment of a computer system according to this invention.

Please refer to FIG. 1, the computer 10 comprises processor 1, read only memory (ROM) 3, main memory 4, storage device 5 and display 6. Processor 1 is coupled to ROM 3, main memory 4, storage device 5, and display 6.

Storage device 5 may be an internal or external device to computer 10 such as a hard disk drive, a compact disc (CD) drive, a PC Memory Card International Association (PCMCIA) card, a flash memory, or a Compact Flash card. Storage device 5 may connect to computer 10 via interfaces of integrated device electronics (IDE), universal serial bus (USB), peripheral component interconnect (PCI), or others. If computer 10 comprises a plurality of storage devices, one storage device may be configured to be a boot device. For example, storage device 5 is the boot device and stores at least one OS kernel, such as kernel 51.

Main memory 4 could be dynamic random access memory (DRAM), static random-access memory (SRAM), or others.

Regarding ROM 3, it stores file name 31 corresponding to a kernel and a file system of a first operating system, and file name 32 corresponding to a kernel and a file system of a second operating system. For example, the first and the second operating systems are respectively Windows CE and Linux operating systems, but are not limited thereto. Meanwhile, ROM 3 further stores trademark image 34, predetermined file system formats, file formats, and file locations for retrieving and decoding file names 31 and 32. As described, ROM 3 may store predetermined file system formats, file formats, file locations for more than two OS kernels.

For example, file name 32 corresponds to a kernel of a Linux OS. The predetermined file format of file name 32 may be the executable and linking format (ELF). File name 31 corresponds to a kernel of a Window CE OS, and the predetermined file format of file name 31 may be the nk.bin format. When a storage device serves as the boot device of computer 10, an OS kernel therein must be converted to conform to the predetermined format of file names 31 or 32.

Figure 2:
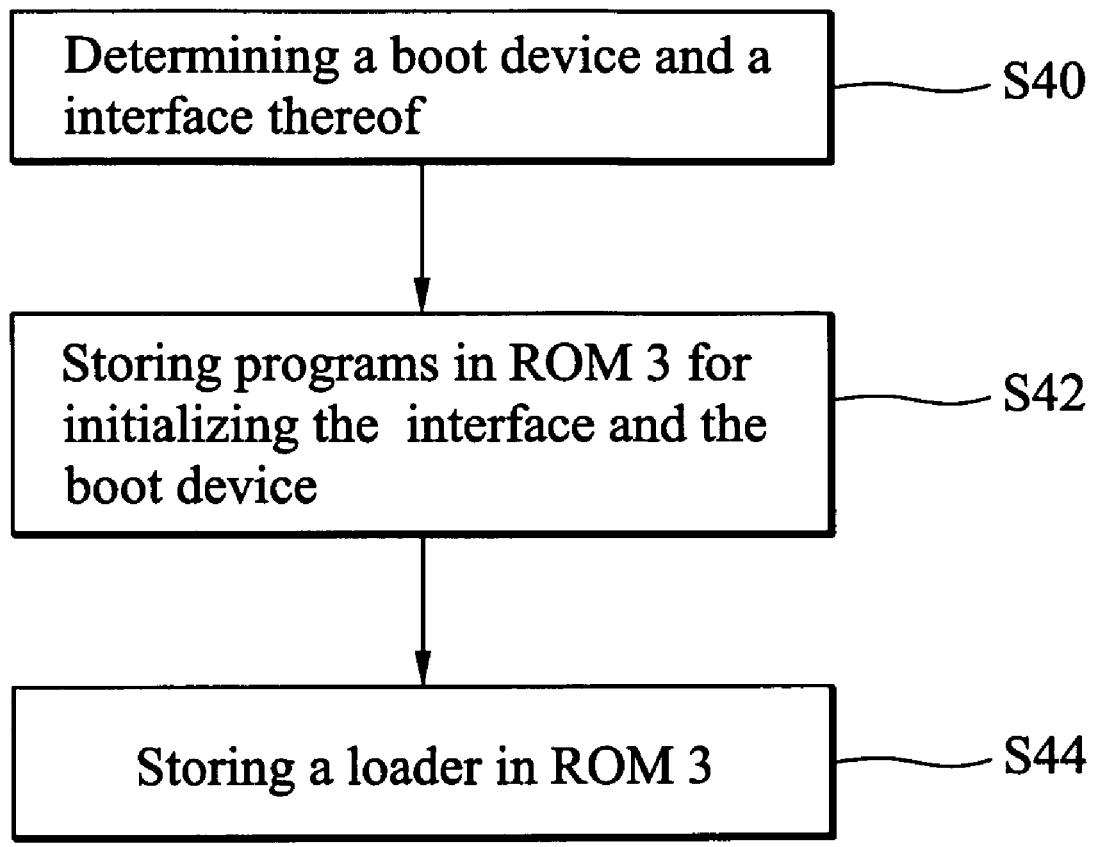
FIG. 2 is a flowchart of a design process stored in the ROM according to this invention.

Please refer to FIG. 2, a design process stored in ROM 3 is provided. First, the interface of a boot device is determined, such as IDE, USB, PCI, or other interface (step S40). For example, ROM 3 with an initialization program may allow a PCMCIA card to be a boot device. Next, with cross reference to FIG. 1, loader 33 and programs for initializing an interface and a boot device are stored in ROM 3 (steps S42 and S44).

Figure 3:
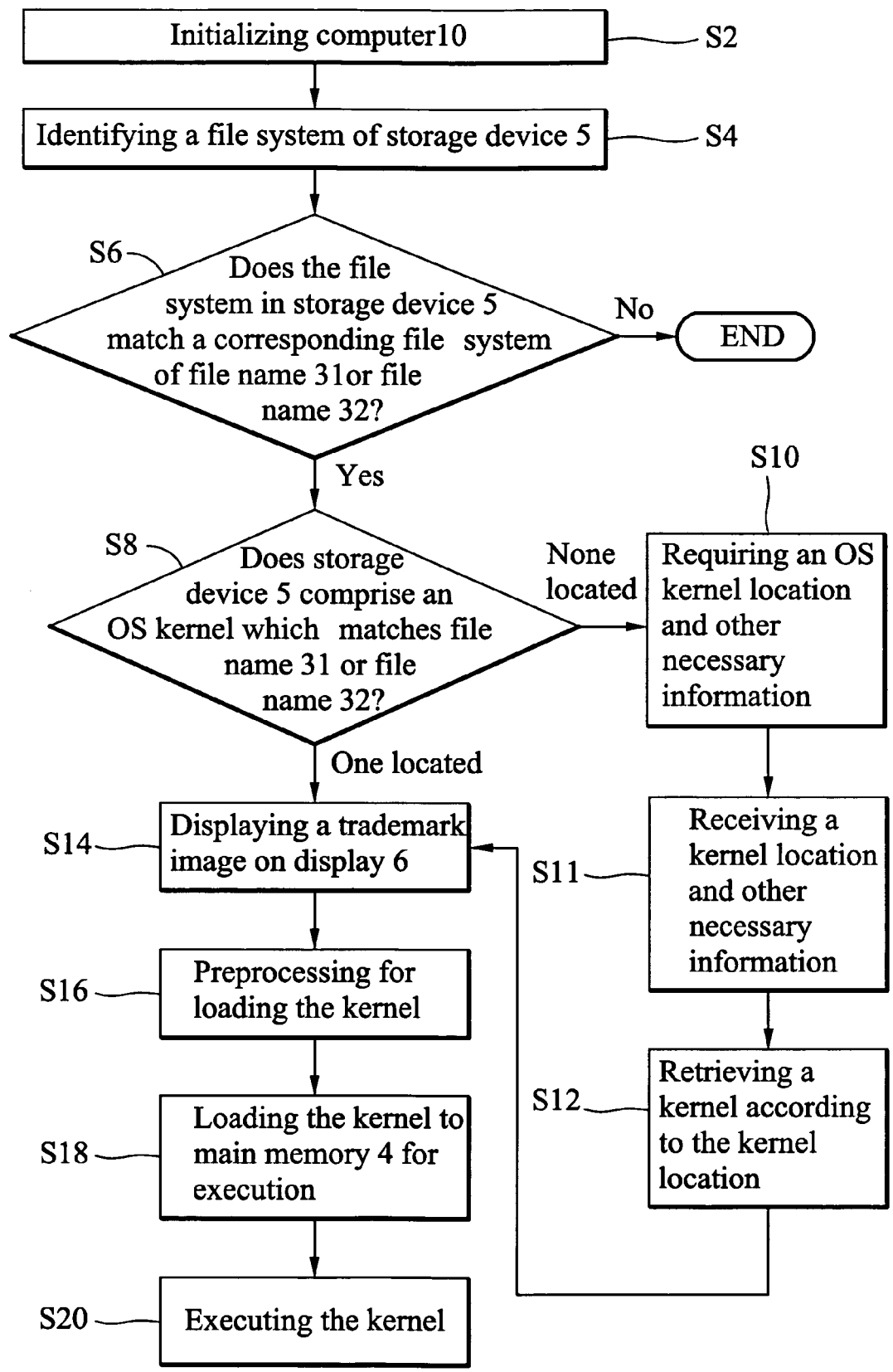
FIG. 3 is a flowchart of an exemplary embodiment according to a booting method provided by this invention.

While computer 10 boots, processor 1 executes instructions in ROM 3 to proceed with the following boot procedures shown in FIG. 3.

Please refer to FIG. 3, computer 10 performs initialization of itself and peripheral devices, comprising initialization of processor 1, main memory 4, storage device 5, and other components of computer 10, such as chipsets (step S2), thus, processor 1 can access storage device 5. A conventional BIOS may be substituted by ROM 3 according to which processor 1 performs the following steps.

In step S4, processor 1 identifies a file system of storage device 5 based on a file system ID. For example, if the file system ID is a hexadecimal number 83, processor 1 determines it to be EXT3 file system. ROM 3 may support but is not limited to EXT3, ISO9960, FAT12, FAT16, and FAT32 file systems.

In step S6, processor 1 determines if the file system in storage device 5 matches a corresponding file system of file name 31 or file name 32. If not, the boot process is terminated.

In step S8, if the file system in storage device 5 matches a corresponding file system of file name 31 or file name 32, processor 1 searches a predetermined location in storage device 5 for an OS kernel which matches file name 31 or file name 32.

ROM 3 may store a plurality of predetermined file locations corresponding to partitions of storage device 5. Processor 1 starts an automatic search with the first partition of storage device 5 according to partition IDs and loads a first located OS kernel, the file name of which matches file name 31 or file name 32.

In Step S10, if no matching OS kernel is located in the predetermined file location, processor 1 may require user to enter the file location and other necessary information (such as kernel file name) of an OS kernel. For example, processor 1 displays a message and an input field receiving file location and other information of an OS kernel on display 6. Processor 1 receives the entered kernel location and file name (step S11) and accordingly retrieves the kernel within storage device 5 (step S12). When the kernel retrieved from storage device 5 has a file name the same as file name 31 or file name 32, step S14 is performed.

In step S14, if an image exists in a directory of the predetermined file location, processor 1 displays the image to replace the trademark image 34 in ROM 3. If no image file exists in the directory, processor 1 shows trademark image 34 on display 6.

On the other hand, processor 1 decodes different kernels with different schemes. For example, processor 1 decodes the Linux kernel according to the ELF specification and decodes the Window CE kernel according to the nk.bin format.

When the kernel is located, processor 1 performs preprocessing before loading the kernel, including allocating space of main memory 4 for the kernel (step S16). Processor 1 of computer 10 loads the kernel to main memory 4 for execution (step S18). Processor 1 then executes the kernel for subsequent boot procedures (step S20).

Figure 4:
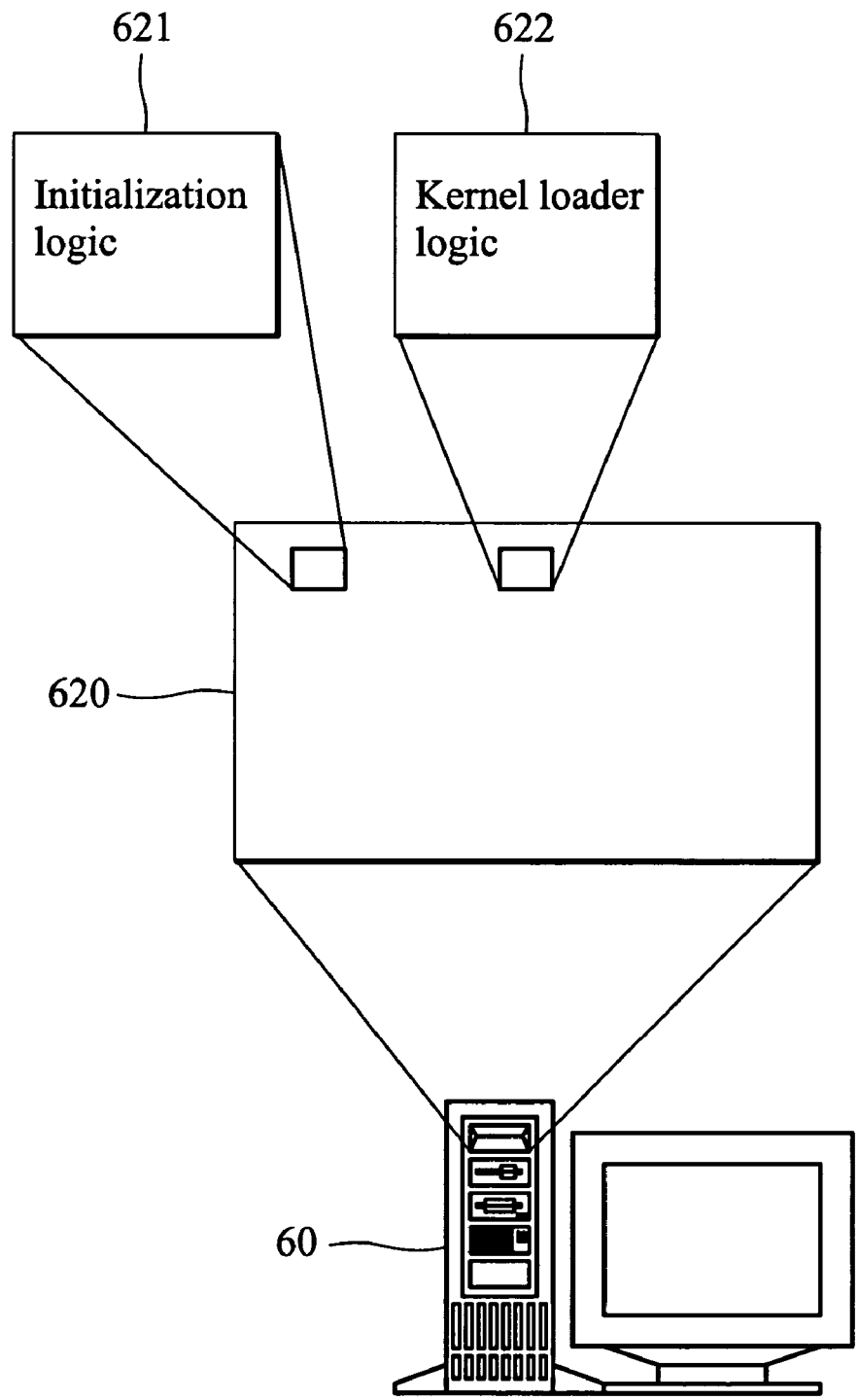
FIG. 4 is a schematic diagram of a computer-readable storage medium implementing a booting method.

In addition, a computer-readable storage medium storing a computer program implementing the booting method is also provided. Please refer to FIG. 4, storage medium 60 stores a computer program 620 implementing the booting method. The computer program 620 comprises initialization logic 621 and kernel loader logic 622. Initialization logic 621 initializes computer 10 to make storage device 5 accessible. Kernel loader logic 622 loads a kernel from storage device 5, the file name of which matches file name 31 or file name 32.

The booting method is different from a typical kernel loading process wherein a kernel loading takes place after a sequence of loader program loading operations. ROM 3 directly stores kernel file names, corresponding to file system types, and predetermined file locations, thus, the OS kernels can be directly loaded to main memory 4. Moreover, processor 1 can load different OSs utilizing records stored in ROM 3.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer comprising:
   a main memory;
   a read-only memory (ROM) storing a loader program, a first file name corresponding to a kernel of a first operating system (OS), and a second file name corresponding to a kernel of a second operating system different from the first operating system;
   a storage device storing a kernel of a third operating system; and
   a processor coupled to the main memory, the ROM, and the storage device, wherein, when booting, the processor first reads and executes instructions on the ROM for initialization, and the processor loads the kernel of the third operating system to the main memory for execution when the kernel file name of the third operating system is the same as the first file name or the second file name.

2. The computer system as claimed in claim 1, wherein the processor identifies the file system in the storage device and automatically retrieves the kernel file name and the kernel of the third operating system according to a predetermined location stored in the ROM.

3. The computer system as claimed in claim 2, wherein the first file name and the second file name respectively correspond to kernels of Windows CE and Linux operating systems.

4. The computer system as claimed in claim 3, wherein the processor decodes the kernel of the Linux operating system according to an executable and linking format (ELF).

5. The computer system as claimed in claim 2, wherein, when the storage device comprises a plurality of partitions, the computer starts to search kernel and the kernel file name of the third operating system from a first partition.

6. The computer system as claimed in claim 5, wherein the storage device comprises a PCMCIA card or a Compactflash card.

7. The computer system as claimed in claim 2, wherein the storage device comprises an external storage device.

8. The computer as claimed in claim 1, wherein the read-only memory is BIOS.

9. A method for booting a computer, comprising:
   providing a loader program, a first file name corresponding to a kernel of a first operating system (OS), and a second file name corresponding to a kernel of a second operating system different from the first operating system stored in a ROM;
   executing the loader program by a processor for initialization of the computer; and
   loading a kernel of a third operating system from a storage device into a main memory, wherein the kernel file name of the third operating system is the same as the first file name or the second file name.

10. The method as claimed in claim 9, wherein the processor identifies the file system in the storage device utilizing the loader program and automatically retrieves the kernel file name and the kernel of the third operating system according to a predetermined location stored in the ROM.

11. The method as claimed in claim 10, further comprising: when the kernel file name and the kernel of the third operating system do not exist in the predetermined location, requiring entry of the kernel file name and the locations of the kernel of the third operating system according to the loader.

12. The method as claimed in claim 10, wherein the first file name and the second file name respectively correspond to kernels of Windows CE and Linux operating systems.

13. The method as claimed in claim 12, further comprising: when a Linux kernel file name being the same as the second file name, decoding the Linux kernel by the processor according to an executable and linking format (ELF) utilizing the ROM.

14. The method as claimed in claim 10, further comprising: when the storage device comprises a plurality of partitions, searching kernel and the kernel file name of the third operating system from a first partition.

15. The method as claimed in claim 10, wherein the storage device comprises an external storage device initialized during the computer initialization.

16. The method as claimed in claim 15, wherein the storage device comprises a PCMCIA card or a Compactflash card.

17. The method as claimed in claim 9, wherein the read-only memory is BIOS.

18. A computer, comprising:
   a main memory;
   a BIOS storing a loader program, a first file name corresponding to a kernel of a first operating system (OS), and a second file name corresponding to a kernel of a second operating system different from the first operating system;
   a storage device storing a kernel of a third operating system; and
   a processor coupled to the main memory, the BIOS, and the storage device, wherein, when booting, the processor first reads and executes instructions on the BIOS for initialization and the processor loads the kernel of the third operating system to the main memory for execution when the kernel file name of the third operating system is the same as the first file name or the second file name.

19. The computer as claimed in claim 18, wherein the processor identifies the file system in the storage device and automatically retrieves the kernel file name and the kernel of the third operating system according to a predetermined location stored in the BIOS.

* * * * *